(12) United States Patent
Allen

(10) Patent No.: US 6,770,156 B2
(45) Date of Patent: Aug. 3, 2004

(54) APPARATUS AND METHOD FOR THE MANUFACTURE OF NONWOVEN WEBS AND LAMINATE

(75) Inventor: Martin A. Allen, Dawsonville, GA (US)

(73) Assignee: Nordson Corporation, Westlake, OH (US)

( * ) Notice: Subject to any disclaimer, the term of this patent is extended or adjusted under 35 U.S.C. 154(b) by 57 days.

(21) Appl. No.: 10/200,685

(22) Filed: Jul. 22, 2002

(65) Prior Publication Data

US 2002/0189748 A1 Dec. 19, 2002

Related U.S. Application Data

(62) Division of application No. 09/539,753, filed on Mar. 31, 2000, now Pat. No. 6,427,745, which is a division of application No. 09/033,883, filed on Mar. 3, 1998, now Pat. No. 6,182,732.

(51) Int. Cl.[7] ............................................. B32B 31/30
(52) U.S. Cl. ...................... 156/62.4; 156/167; 156/181; 264/113
(58) Field of Search ............................... 156/62.4, 167, 156/180, 181; 425/72.2, 464; 264/113

(56) References Cited

U.S. PATENT DOCUMENTS

| | | | |
|---|---|---|---|
| 3,565,729 A | 2/1971 | Hartmann | 156/441 |
| 3,755,527 A | 8/1973 | Keller et al. | 156/167 X |
| 3,841,953 A | 10/1974 | Lohkamp et al. | 156/181 X |
| 3,870,567 A | 3/1975 | Palmer | 156/167 |
| 3,972,759 A | 8/1976 | Buntin | 156/181 X |
| 4,041,203 A | 8/1977 | Brock et al. | 428/157 |
| 4,340,563 A | 7/1982 | Appel et al. | 264/518 |
| 4,604,313 A | 8/1986 | McFarland et al. | 428/172 |
| 5,160,746 A | 11/1992 | Dodge, II et al. | 425/7 |
| 5,580,581 A | 12/1996 | Buehning | 425/72.2 X |
| 5,605,706 A | 2/1997 | Allen et al. | 425/72.2 |
| 5,679,042 A | 10/1997 | Varona | 442/347 |
| 5,679,379 A | 10/1997 | Fabbricante | 425/72.2 X |
| 5,688,468 A | * 11/1997 | Lu | 264/555 |

FOREIGN PATENT DOCUMENTS

| | | |
|---|---|---|
| AU | 72439/87 | 11/1987 |
| EP | 0462574 A | 12/1991 |
| EP | 0822282 | 2/1998 |
| GB | 201087 | 7/1923 |
| GB | 2190111 A | 11/1987 |

* cited by examiner

*Primary Examiner*—Sam Chuan Yao
(74) *Attorney, Agent, or Firm*—Wood, Herron & Evans, L.L.P.

(57) ABSTRACT

Nonwoven laminates are made by a multi-station line comprising at least one spunbond die assembly and at least one meltblowing die assembly. Each station includes (a) a melt spinning die which can be selectively equipped with a spunbond die insert or a meltblowing die insert and (b) a moveable support structure for adjusting the proper die-to-collector distance, depending on the spunbond or meltblowing mode of operation. The multi-station line permits the selective manufacture of a variety of spunbond (S) and meltblown (M) laminates, including the S-M-S laminate.

5 Claims, 7 Drawing Sheets

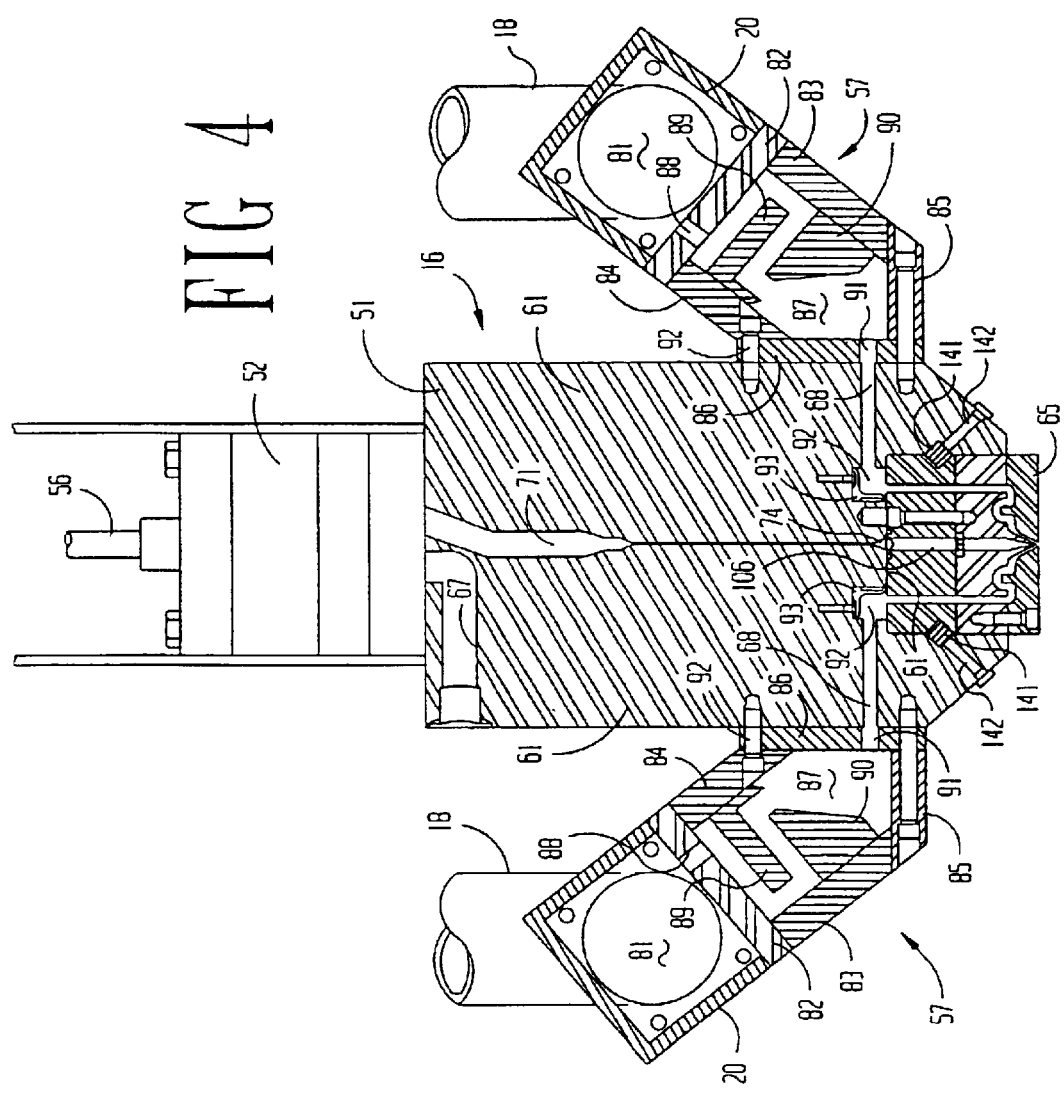

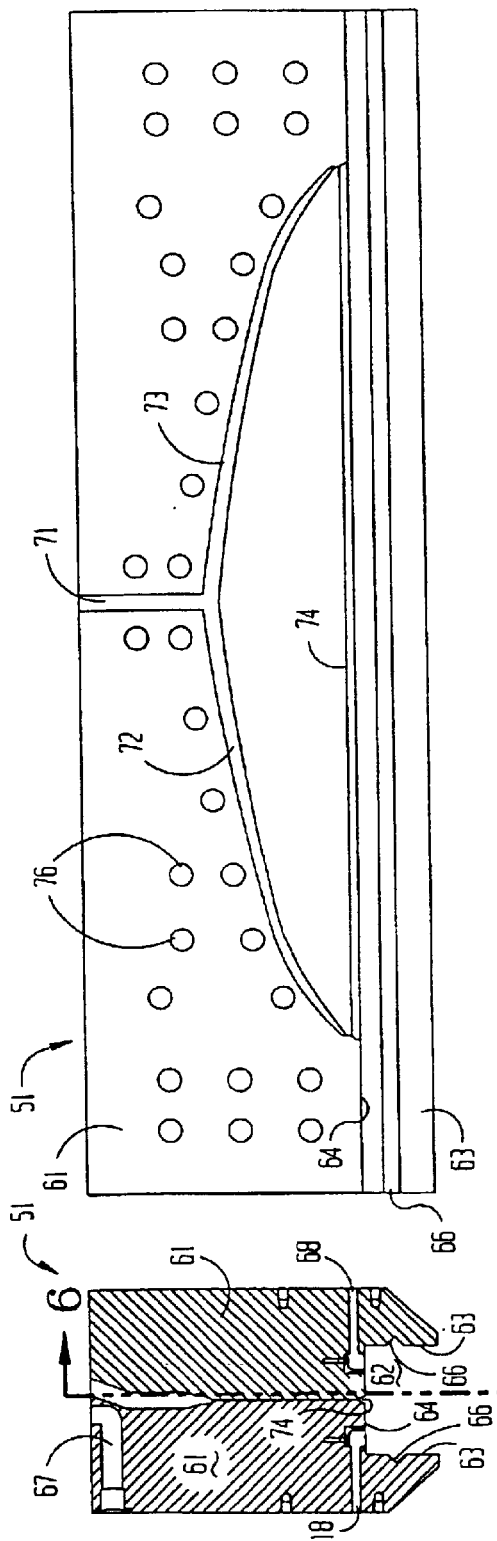
FIG 5
FIG 6
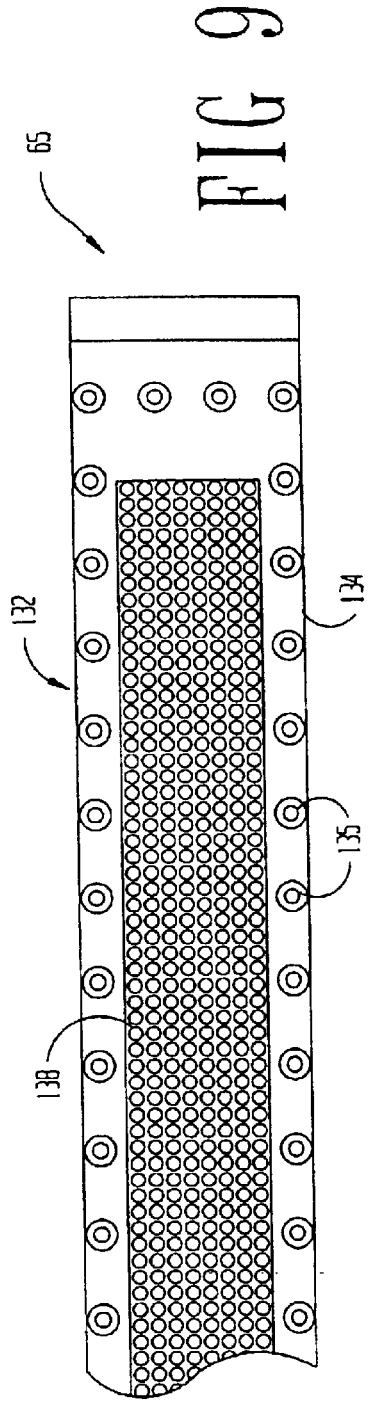
FIG 9

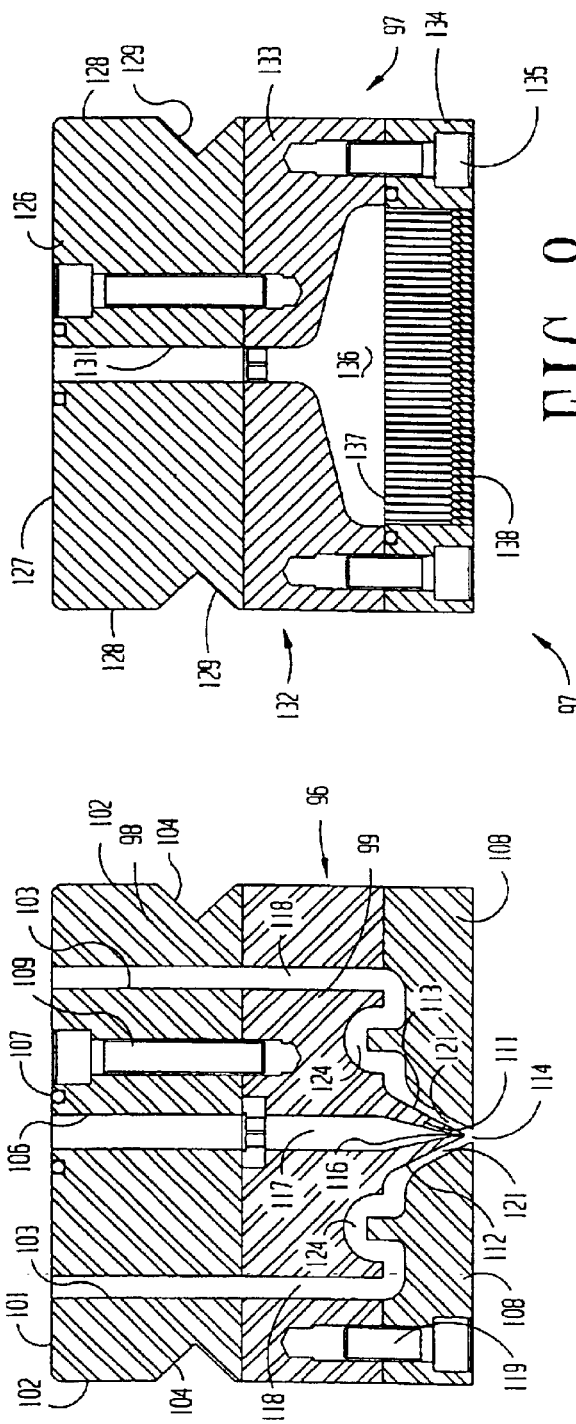
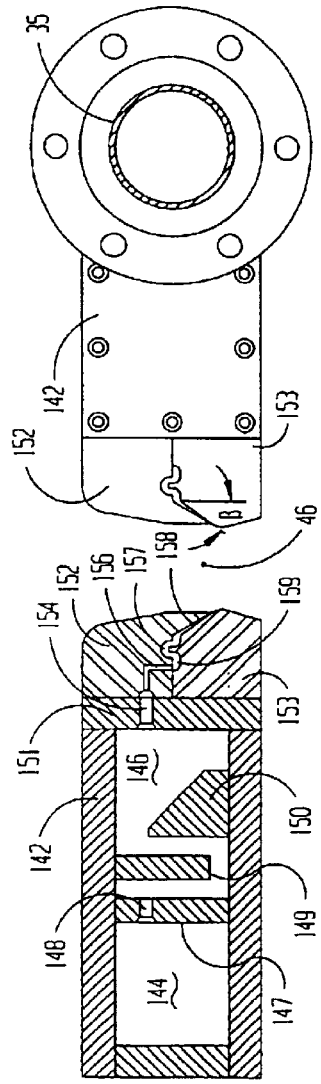
FIG 7
FIG 8
FIG 11

APPARATUS AND METHOD FOR THE MANUFACTURE OF NONWOVEN WEBS AND LAMINATE

This application is a divisional of application Ser. No. 09/539,753, filed Mar. 31, 2000 now U.S. Pat. No. 6,427,745, which is a divisional of application Ser. No. 09/033,883, filed Mar. 3, 1998 (now Pat. No. 6,182,732), the disclosures of which are fully incorporated herein by reference.

BACKGROUND OF THE INVENTION

This invention relates generally to the manufacture of nonwoven webs by meltblowing and/or or spunbond processes. In one aspect, it relates to an apparatus with interchangeable meltblowing and spunbond dies. In another aspect, the invention relates to a novel filament drawing or stretching device. In still another aspect, the invention relates to the in-line manufacture of spunbond-meltblown laminates.

Nonwoven fabrics have received commercial application in a variety of industries ranging from medical, diapers, filtration, apparel, draperies, absorption, environmental, to name but a few of such uses.

The term "nonwoven" refers to a sheet, web or batt of directionally or randomly oriented fibers, made by bonding or entangling the fibers through mechanical, thermal, or chemical means. Nonwoven fabrics exclude paper and products which are woven, knitted, tufted, or felted by wet milling. The fibers generally are man-made synthetics.

Although nonwovens may be made by a number of processes, the most popular processes currently in use are meltblowing and spunbond processes. Meltblowing is a process for the manufacture of a nonwoven fabric wherein a molten thermoplastic is extruded from a die tip to form a row of filaments (e.g. fibers). The fibers exiting from the die tip are contacted with converging sheets or jets of hot air to stretch or draw the fibers down to microsize diameter. The fibers are then deposited onto a collector in a random manner and form a nonwoven fabric.

The spunbond process involves the extrusion of continuous filaments through a spinneret. The extruded filaments are maintained apart and the desired orientation of the filaments are achieved by rotating the spinneret, by electrical charges, by controlled air streams, or by the speed of the collector. The filaments are collected on the collector and bonded by passing the layer of filaments through compacting roll and/or hot row calendering. Spunbonded webs generally have large average diameter (e.g. 12–100 microns, typically 15–50 microns) which are heavier and stiffer then meltblown fibers (e.g. 0.5–15 microns, typically 1–10 microns).

A paper presented at "Fiber Producer Conference 1983", in Greenville, S.C., entitled "Nonwoven Fabrics: Spunbonded and Meltblown Processes" describes the two processes in detail. The disclosures of this paper are incorporated herein by reference. It should be noted that the terms "fibers" and "filaments" when used in connection with nonwovens are interchangeable.

The meltblown fabrics are characterized as soft, porous with good hand, but are deficient in strength properties such as tensile strength and are not very wear resistant. On the other hand, the spunbond fabrics possess good strength properties and wear resistant but are not as flexible as meltblown fabrics.

It was discovered several years ago that the properties of the meltblown and spunbond fabrics could be combined by a laminate consisting of at least one layer of the meltblown web and at least one layer of the spunbond web. U.S. Pat. No. 4,041,203 discloses such a laminate. Over the years, improvements have been made in the laminate, the most popular being the so called S-M-S structure (spunbond-meltblown-spunbond) wherein a meltblown layer is flanked by two spunbond layers. The layers may be bonded together by compaction or by calendering, and exhibit outstanding strength properties, energy absorption, tensile strength, and tear resistance, and yet possess a soft, flexible feel or hand.

The S-M-S structures can be made by laminating the preformed webs or can be made by in-line operations wherein (a) spunbond filaments are laid on a moveable collector forming a first layer, (b) meltblown filaments are deposited on the first layer, and finally, (c) a second layer of spunbond filaments is deposited on top of the meltblown layer. The three layered structure then can be bonded together.

The in-line operation thus requires two spunbond apparatus and one meltblowing apparatus. The spunbond apparatus are large structures because of the long distance of the collector from the spinneret and are not readily adapted to other processes such as meltblowing. The meltblowing apparatus, on the other hand, employs a relatively short distance from the die to the collector and is not readily adapted to the spunbond process. The in-line apparatus thus is restricted to manufacturing only one type of laminate: the S-M-S laminate or portions thereof.

SUMMARY OF THE INVENTION

It is an object of the present invention to provide an apparatus which features interchangeable dies. That is, a spunbond apparatus can be readily converted to a meltblowing apparatus; or alternatively, a meltblowing apparatus can be readily converted to a spunbond apparatus.

It is further an object of the present invention to provide a multi-station, in-line spinning operation or method wherein each station can be selectively operated to produce a spunbond web, or a meltblown web. The flexibility of each station permits the selective manufacture of a variety of laminates which include meltblown and/or spunbond layers in different combinations.

It is a further object of the present invention to provide a meltblowing die with a filament drawing device to increase the filament drawdown and produce finer filaments. The filament drawing device can also be used with advantage on the spunbond apparatus.

BRIEF DESCRIPTION OF THE DRAWINGS

FIG. 4 is an enlarged cross-sectional view of a portion (die body) of the melt spinning assembly shown in FIG. 3.

FIG. 5 is a cross-sectional view of the die body shown in FIGS. 3 and 4 without a die-insert mounted therein.

FIG. 6 is a cross-sectional view of the die body shown in FIG. 5 with the cutting plane taken along 6—6 thereof.

FIG. 7 is an enlarged view of a meltblowing die insert shown detached from the die body and shown in transverse cross-section.

FIG. 8 is an enlarged view of a spunbond die insert and shown in transverse cross-section.

FIG. 9 is a bottom plan view of the spinneret shown in FIG. 8.

FIG. 11 is a partial cross-sectional view of the filament drawing device shown in FIG. 10 with the cutting plane taken along lines 11—11 thereof.

DESCRIPTION OF THE PREFERRED EMBODIMENTS

Because of the complexity of the structures embodied in the present invention, the invention will be described first, and with general reference, to the three station in-line assembly (FIG. 1), followed by the description of the various components thereof, including the melt spinning assembly, the meltblowing die insert, the spunbond die insert, the filament drawing device, and an alternative design for the meltblowing assembly. Following the description of the various components, the operation of the assembly will be described illustrating the flexibility of the multi-station line, particularly with respect to the interchangeability of the dies at each station.

Figure 1:
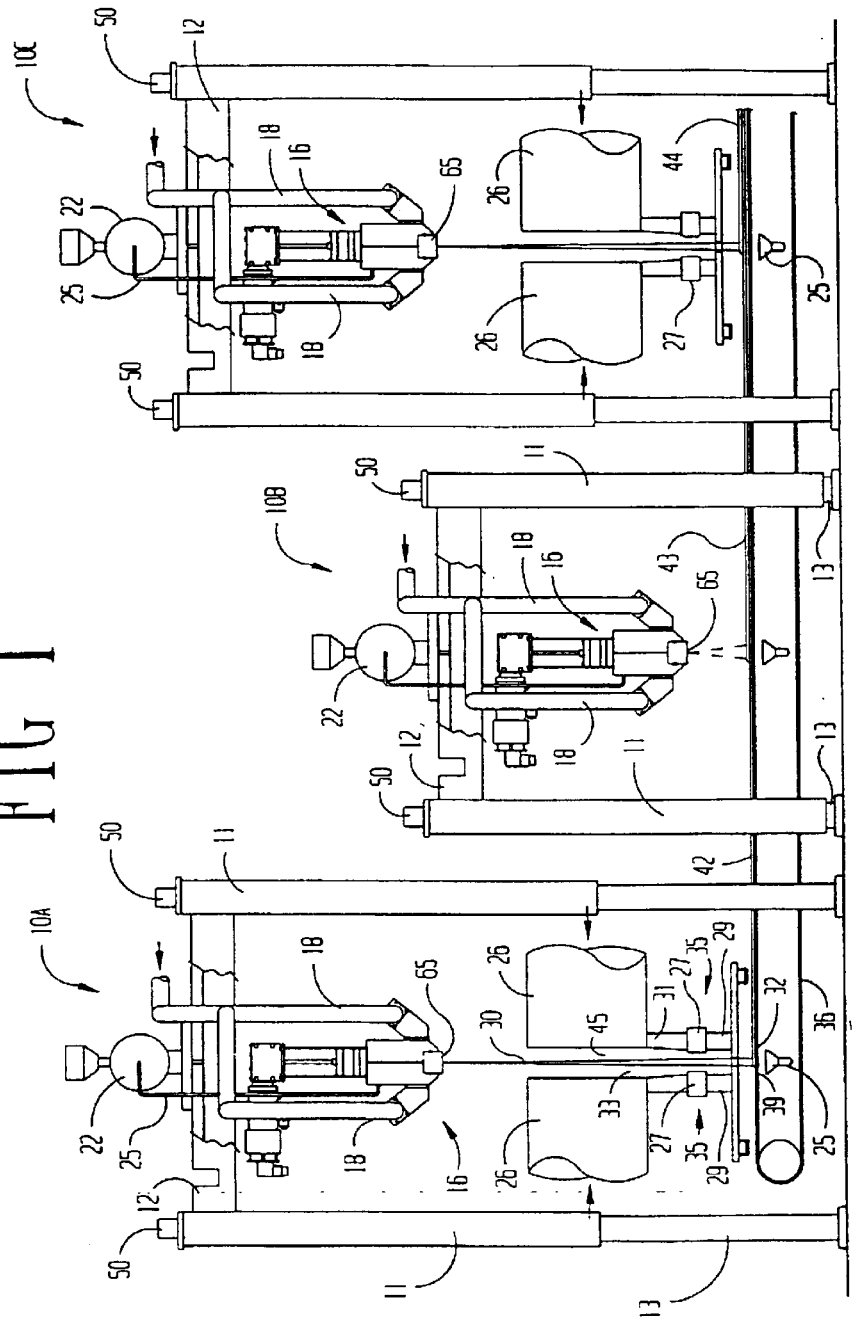
FIG. 1 is a side plan view of an in-line three station assembly showing the first and third stations in the spunbonding mode and the middle station in a meltblowing mode.
Figure 2:
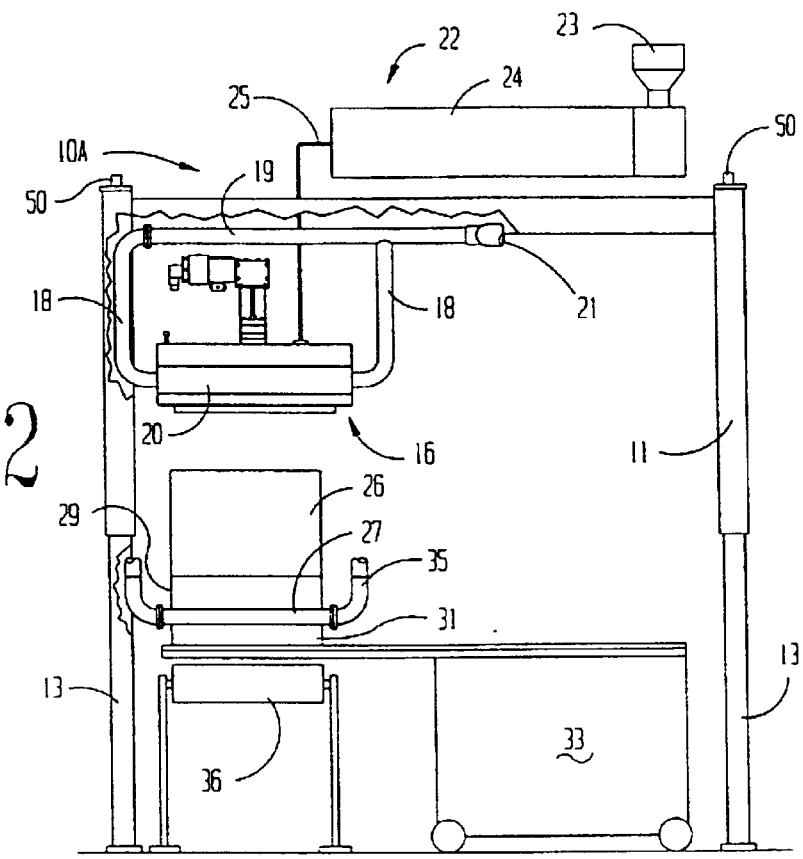
FIG. 2 is a side plan view of the apparatus shown in FIG. 1 showing the side view of the first station.

General Description of the Multi-Station Line (FIGS. 1 and 2)

The stations 10A, 10B and 10C of the multi-station line may include many identical components. The same reference numerals will designate the corresponding component at each station. For example, the extruder at each station is designated by reference numeral 22.

Figure 13:
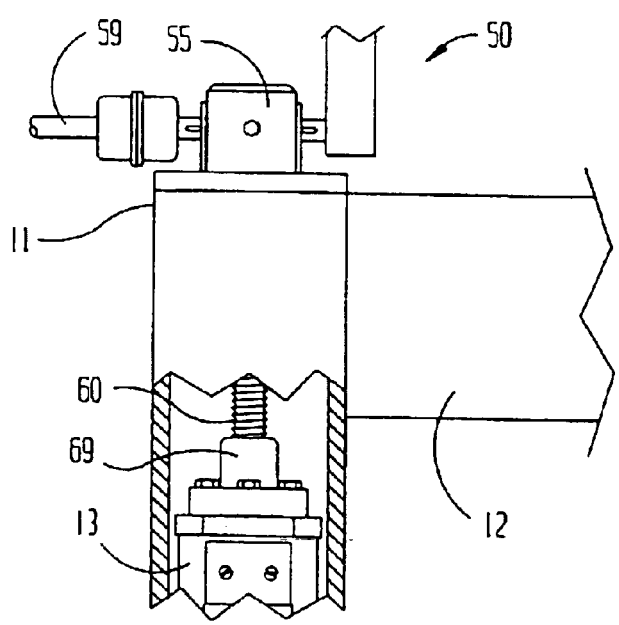
FIG. 13 is a fragmentary, enlarged view of a portion of the support structure illustrating a lifting jack for telescopically moving concentric legs of the support structure.

Referring specifically to station 10A, this station comprises a support structure which may be in the form of four vertical legs 11 interconnected by cross beams 12. Each of the legs 11 are hollow and are concentrically mounted over interior legs 13 which are anchored to the floor. The legs 11 and 13 may be of any cross section but are preferably square and are sized to permit telescopic movement therebetween. The means for telescopically moving the outer legs 11 in relation to the inner legs 13 may take a variety of forms including hydraulic rams. The preferred means, however, is a conventional screw jack assembly 50 located at the upper end of each leg 11 as illustrated in FIG. 13. The jack assembly 50 comprises a gear box 55 driven by drive shaft 59 which turns screw 60. Screw 60 is threaded to bushing 69 affixed to the upper end of leg 11. Turning the screw 60 in one direction raises the legs 11 and support structure 15. Turning the screw 60 in the opposite direction lowers the legs 11 and support structure 15. The support structure 15 and equipment mounted thereon is thus moveable vertically between an upper position (station 10A) and a lower position (station 10B).

A melt spinning assembly, shown generally as 16, is mounted on the moveable support structure 15 by air pipes which include a pair of vertical air pipes 18 (see FIG. 2) and a horizontal pipe section 19. There are two pairs of air pipes 18, one pair being mounted on each side of the melt spinning assembly 16. One pair, shown in FIG. 2, is connected to opposite ends of air box 20 of the melt spinning assembly 16 as described in detail below. The horizontal pipe 19 of each pair of pipes may be secured to cross beam 12. Thus the melt spinning assembly 16 is suspended on the moveable support structure 15. (The term "melt spinning assembly" is used herein in the generic sense referring to both meltblowing and spunbond die assemblies.)

An extruder 22 is mounted on the moveable support structure 15 as illustrated in FIG. 2 and comprises hopper 23, barrel 24, and polymer feed line 25. The polymer feed line 25 delivers polymer melt to the melt spinning assembly 16 as described in more detail below.

Positioned directly under the melt spinning assembly 16 and in alignment therewith are a pair of air quench ducts 26 and a filament drawing device 27. These two components, 26 and 27, are both supported on a platform 28 in stacked relationship by brackets (see FIG. 2). The pair of ducts 26 define a quench zone 49 therebetween. The drawing device 27 is also constructed as a pair of conduits defining a filament drawing or stretching zone 46 therebetween. The vertical space between the quench ducts 26 and the drawing device 27 may include sheet metal housing 47 and the vertical space between drawing device 26 and platform 28 may include sheet metal housing 48. The platform 28 has an opening 32 formed therein. The filaments 30 discharging from the melt spinning assembly the descend through the quench zone 45, housing 47, draw zone 46, housing 48, opening 32 and are deposited on belt or conveyor 36. The components 26, 27, 47 and 48 are mounted on a wheeled carriage 33, as illustrated in FIG. 2, so that this assembly may be moved as a unit to the operating position (FIG. 2) or moved at right angles to the conveyor 36 to an inoperative position.

The conveyer 36 traverses all three stations as illustrated in FIG. 1 and is adapted to collect filaments from each station. The conveyor 36 is perforated or a fine-mesh screen to permit the passage of air therethrough. Vacuum means 25 positioned under conveyor 36 at each station may be used to withdraw the air and debris.

Air is delivered to the quenching ducts 26 as shown schematically at 34, and air is delivered to the filament drawing device 27 as shown at 35.

Station 10C is substantially identical to station 10A, both of which depict the spunbond mode of the equipment mounted thereon. The melt spinning assembly 16 at these stations are provided with spunbond die inserts as described below.

Station 10B represents the meltblowing mode of the apparatus. In this mode, the carriage 33 and equipment mounted thereon is moved to the inoperative position and therefore does not appear in FIG. 1 for station 10B. In this station, the moveable support structure 15 is moved to its lower position. The lower position of the moveable support structure 15 is required because of the short distance between the meltblowing die outlet and the conveyor 36. The melt spinning assembly 16 of station 10B is provided with a meltblowing die insert.

The operation of the three station line shown in FIG. 1 is as follows: spunbond filaments 30 are deposited on the conveyor 36 forming a filament layer 42. Layer 42 is carried under the meltblowing die at station 10B which deposits meltblown filaments thereon forming layer 43. These layers are carried under station 10C where another layer 44 of spunbond filaments are laid thereon. As noted above, layers may be further processed through calendering or compaction to bond them together.

Figure 3:
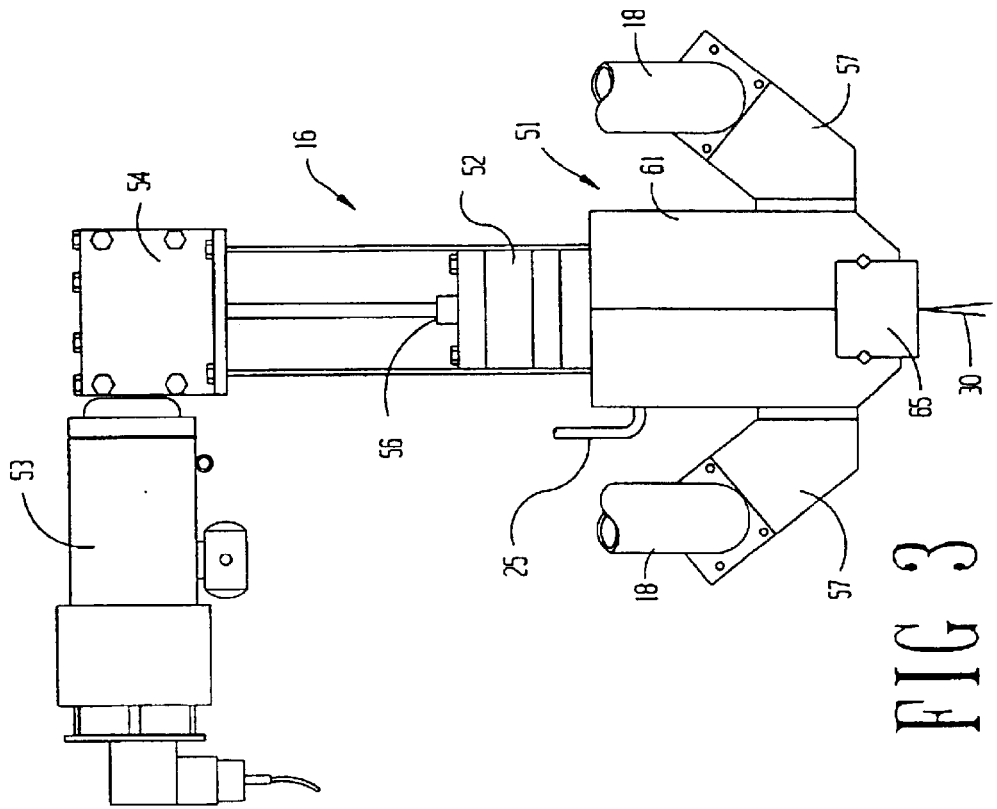
FIG. 3 is an enlarged front view of the melt spinning assembly shown in each of the three stations.

Melt Spinning Assembly (FIG. 3)

The term "melt spinning" as used herein means the conversion of a polymer melt to filaments by extruding the melt through orifices. The spinning assembly comprises a die assembly 51, positive displacement pump 52, motor 53, gear box 54, and shaft 56. The polymer feed line 25 delivers polymer melt to the spinning assembly 16. Motor 53 drives the gear pump 52 which receives the polymer melt and delivers the same at metered rates to the die assembly 51 which distributes and discharges the melt through orifices as filaments 30.

Air connectors 57 and 58 mounted on each side of the die assembly 51 connect to the air lines 18 which delivers pressurized hot air to the die assembly 51 in meltblowing mode.

The gear pump 52, motor 53, and gear box 54 may be similar to that described in U.S. Pat. No. 5,236,641, the disclosure of which is incorporated herein by reference.

As best seen in FIG. 5, the die assembly 51 comprises a die body 61 having a downwardly opening cavity 62 formed in its lower end. Die body 61 may be constructed in halves as illustrated in FIG. 5, wherein one half has a polymer inlet passage 67 connected to line 25 for feeding the polymer melt to the inlet of the gear pump 52.

The cavity 62 is defined by two elongate side walls 63 and top surface 64. Elongate, v-shaped grooves 66 are formed on each side wall 63.

The die body 61 has longitudinally spaced air passages 68 for interconnecting air connectors 57 and 58 with opposite sides of the cavity 62.

As best seen in FIG. 6, the die body 61 has formed therein a "coathanger" distribution configuration comprising inlet 71, lateral channels 72 and 73, the ends of which are interconnected with channel 74. The area circumscribed by channel 72, 73 and 74 is specially shaped to affect a uniform distribution of the polymer entering inlet 71 to channel 74, consistent with known coathanger type distribution systems. Holes 76 shown in FIG. 6 are adapted to receive bolts for bolting the two body halves 61 together. Electrical heaters may be mounted in the die block 61 for maintaining the temperature of the die body at the operating level.

Inlet passage 71 registers with the outlet of the gear pump 52 to receive polymer melt therefrom and to distribute the same equally to channel 74.

As mentioned previously, the air box 20 on each side of the die body 61 is suspended between pipes 18. (See FIG. 2). As best seen in FIG. 4, each air box 20 defines an internal elongate square chamber 81 which extends substantially the entire length of the die body 61 and is connected to the air connector 57 through plate 82 as by welded connections.

Each connector 57 may be a welded assembly of plates 83, 84, 85 and 86 which in combination define an internal air chamber 87 and is bolted to each side of body 61 by bolts 92. Plate 82 has a plurality of air passage holes 88 distributed along the length thereof for feeding air from chamber 81 to chamber 87. Mounted within chamber 87 are baffles 89 and 90 which define a tortuous flow path within chamber 87. The outlet for chamber 87 is provided by a plurality of air holes 91 which register with the plurality of air holes 68 formed in the die body 61.

The air passage 68 formed in each die half of body 61 extends to the interior of the die body and forms a right angle discharge into cavity 62 as at 92. The right angle turn in the flow passage 68 may be smoothed by the use of inserts 93 bolted to the die body as illustrated.

Air delivered to each connector 57 flows from the air chamber 81 defined thereby inwardly to air passage 68 and enters the cavity at air passages 92.

As indicated previously, the die assembly comprises die body 61 and a die insert assembly 96 or 97 which fits into and is mounted within cavity 62. The insert assembly may be in the form of a meltblowing die (herein referred to as meltblowing die die insert 96) shown in FIGS. 4 and 7 or may be in the form of a spunbond spinneret (herein referred to as spunbond insert 97) shown in FIGS. 8 and 9.

Meltblowing Die Insert (FIGS. 4 and 7)

Referring first to the embodiment using the meltblowing die insert 96, this assembly comprises a support member 98 (sometimes referred to as a transfer plate) and a die tip 99 mounted thereon. Members 98 and 99 are joined by a series of bolts (one shown as 109). Member 98 has a top surface 101 which contacts surface 64 of cavity 62, and has side walls 102 which fit in close conformity with the side walls 63 of cavity 62. Also formed in the support member 98 are a pair of longitudinally extending V-shaped grooves 104. These grooves align with the cavity grooves 66 with the insert 96 mounted in cavity 62. A plurality of air holes 103 extend vertically through the support member 98. The inlet of each air passage 103 is aligned with the outlet 92 of each air passage formed in the die body 61. Also formed in the support member 98 is an elongate channel 106 that extends through the longitudinal axis thereof. The inlet of channel 106 registers with channel 74 of the die body 61 with the meltblowing die insert 96 mounted in cavity 62 (see FIG. 4). An o-ring 107 surrounds the inlet 106.

The die tip assembly 99 comprises a die tip 107 and a pair of air plates 108. The die tip 99 has a downwardly projecting triangular nosepiece 111 defined by converging surfaces 112 and 113. Surfaces 112 and 113 meet at apex 114, and a plurality of orifices 116 are spaced longitudinally along the apex 114. A polymer flow channel 117 extends through the die tip 99 and has an inlet which is aligned with polymer flow passage 106 of support member 98. The flow passage 117 pinches down to deliver polymer to the orifices 117. The nosepiece 111 may be integrally formed in the die tip 99 as illustrated or may be a separate piece bolted to the body of the die tip 99.

Also formed in the die tip 99 are air passages 118 which register with air passages 103 of support member 98. The air plates 108 are mounted on the die tip 99 by a plurality of bolts, one shown as 119. The air plates 108 flank the nosepiece 111 and with surfaces 112 and 113 define converging air gaps 121. Each air plate 108 defines with a confronting surface of the die tip a tortuous air passage 124.

The meltblowing die tip insert 96 fits in close conformity in cavity 62 of the die body 61. As described, the polymer flow passages and air passages of the assemblies are respectively in fluid communication so that air flows through the assembly discharging from air gaps 121 as converging air sheets at the apex 114 of the nosepiece as polymer flows from the gear pump 52 through the die body 61, the meltblowing die insert 96 discharging as filaments through orifices 116 of the die tip.

The meltblowing assembly at Station 10B may include chilled quench air (secondary air) by separate air ducts (not shown) which discharge chilled air onto the filaments as they are extruded from the orifices 116.

Figure 14:
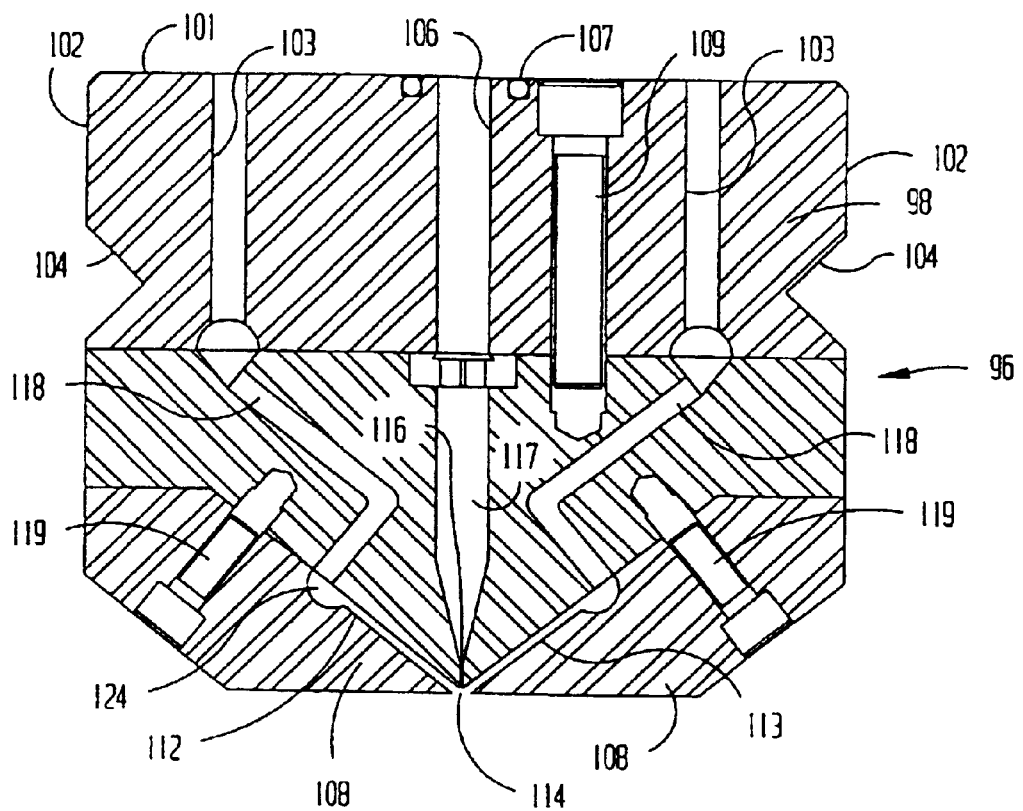
FIG. 14 is a cross sectional view of a different meltblowing die insert.

FIG. 14 illustrates an alternative meltblowing die insert design. Corresponding parts illustrated in FIG. 7 are indicated by the same reference numerically in FIG. 14. The die insert is also described in more detail in U.S. Pat. No. 5,145,689, the disclosure of which is incorporated herein by reference.

Spunbond Die Insert (FIGS. 8 and 9)

The spunbond die insert 97 comprises a support member 126 which may be substantially identical to support member 98 described previously except no air passages are formed therein. The support member 126, however, does have the top surface 127, side surfaces 128, and v-shaped grooves 129 which may be identical surfaces 101, 102, and grooves 104, respectively of the meltblowing die insert 96.

Support 126 is provided with a polymer opening or channel 131 which aligns with channel 74 of the die body 61 with the die insert 126 mounted in cavity 62. Note that since there are no air passages in support member 126, the air passages in the die body 61 are blocked off by surface 127.

The support member 126 is attached to spunbond spinneret 132 which comprises a body member 133 and a spinneret plate 134 bolted together by a plurality of bolts 135. The body member 133 in combination with the plate 134 defines a feed chamber 136 having an inlet in registry with passage 131 of the support member 128. The spinneret plate 134 has a plurality of flow passages 137 formed therein which reduce down to orifices 138 at their outlets. As shown in FIG. 9, the orifices 138 form a grid through which the filaments are extruded. The number and spacing of the orifices 138 may be in accordance with well known spunbond practices. (See for example U.S. Pat. Nos. 4,340,563, 5,028,375 and 5,545,371.)

Each of the die inserts 96 and 97 are selectively inserted into the cavity 62 of the die body 61 and maintained there in place by a pair of square bars 141 which fit into square holes defined by v-grooves 66 and 104 or 129 on each side wall of the cavity 62. With the selected die insert 96 or 97 in place and the bars 141 inserted, bolts 142 spaced therealong, and threaded thereto on each side of die body 61 engage one side of the bar 141 so that turning the bolts in one direction clampingly secures the insert sealingly onto cavity top surface 64.

The above description of the die body 61 and meltblowing and spunbond die inserts 96 and 97 makes it clear that the system can be readily converted from one mode to the other by simply selecting the insert die and inserting it into the cavity 62. This, of course, requires the adjustment of the moveable support structure 15 to accommodate the operating mode. The means for inserting the die inserts 96 or 97 into cavity 61 may be manual or automatic. Stations 10A and 10C in FIG. 1 depicts the spunbond mode and station 10B depicts the meltblowing mode.

At station 10B, polymer melt is delivered from the extruder 22 through the melt spinning assembly 16 provided with meltblowing die insert 96 and discharged as microsized filaments from the row of orifices 116. The filaments 116 are contacted on opposite sides by converging hot air streams and carried to and deposited on the conveyor 36. In the meltblowing mode, the moveable support structure is positioned at its lower position.

For the spunbond mode of operation (stations 10A and 10B), the spunbond die insert 97 is inserted in the die body 61 and the moveable substructure 15 is moved to its upper position. The quench air assembly 26 and filament drawing device 27 are positioned in place by moving the carriage 33 to the position in FIG. 2. Air is delivered to the quench ducts 26 and to the drawing device 27 while filaments 30 extruded through orifices 138 descend from the spinning assembly 16 through the quench zone 45 and drawing zone 46 and are finally deposited on the conveyor 36.

Figure 10:
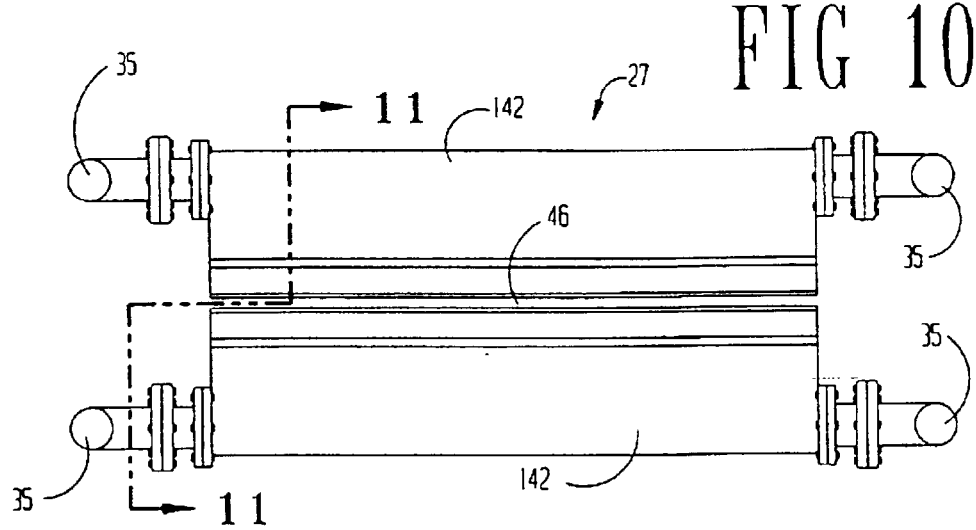
FIG. 10 is an enlarged top plan view of the filament drawing device shown in FIGS. 1, 2 and 12.

Filament Drawing Device (FIGS. 10 and 11)

The filament drawing device 27 serves to drawdown or stretch the filaments of either the spunbond mode or meltblowing mode of operation. As illustrated in FIGS. 1 and 2, a pair of longitudinally extending air conduits 142 are disposed below the quench ducts 26. The air conduits 142 are separated by space (the stretching zone 46), through which the extruded filaments pass. Each of the conduits 142 is connected to an air supply 35 and, as shown in FIG. 11, comprises a rectangular chamber 144 which receives air from two pipes 35 at opposite ends thereof. Each conduit 142 is divided by a separation plate 147 into a second chamber 146. Plate 147 has a plurality of holes 148 distributed longitudinally therealong, providing fluid communication between chambers 144 and 146. Mounted in each chamber 146 are a pair of baffles 149 and 150 which define a tortuous path for the air flowing through chamber 146. An end wall 151 defining chamber 146 is secured a pair of elongate members 152 and 153 which in combination define a tortuous path for the air flowing therethrough. A plurality of holes 154 formed in end wall 151 discharge into a plurality of air passages 156 which discharge into air passage 159 defined by confronting surfaces of member 152 and 153. The outlet 158 of the air passage 157 is directed downwardly with respect to the filaments flowing through stretching zone 46. The angle of contact of the air discharging from the elongate passage 158 with respect to the filaments passing therethrough should be between about 1 and 80 degrees (included angle β) preferably between 5 and 50 degrees, most preferably 10 to 30 degrees.

As the filaments pass through zone 46, the converging air sheets from passages 158 of each half of the drawing device 27 impart drag forces thereto and stretches or draws down the filaments to a smaller diameter.

Figure 12:
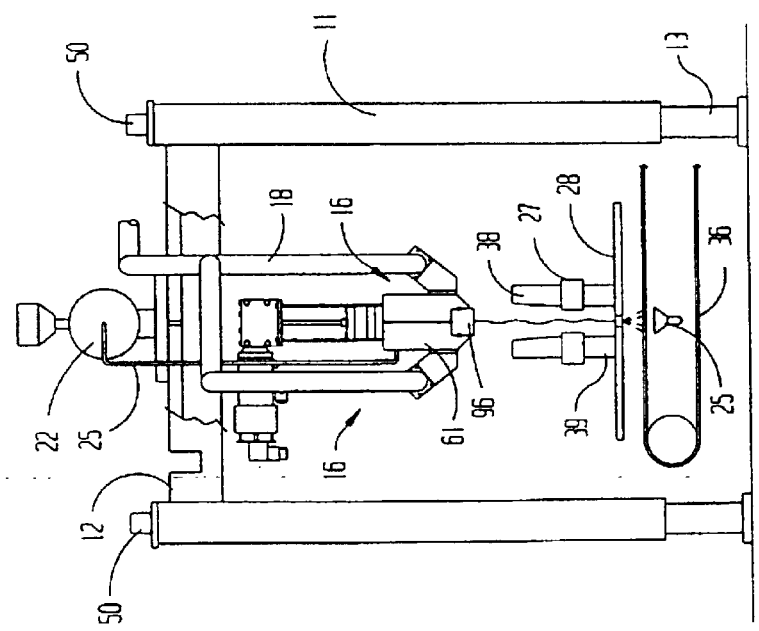
FIG. 12 is a side plane view illustrating a modified meltblowing die assembly equipped with a filament drawing device shown in FIGS. 10 and 11.

Meltblowing Die Assembly with Filament Drawing Device (FIG. 12)

FIG. 12 illustrates an alternative meltblowing mode of operation, wherein the melt spinning assembly 16 is provided with a meltblowing die insert 96 and is mounted above the drawing device 27. As illustrated, the device 27 may be mounted on the platform 28 which, as described above, is mounted on a carriage 33 for removing or inserting the device 27 in the line. Sheet metal may be also used to define housings 38 and 39 through which the meltblown fibers must pass. As the fibers pass through housing 38, drawing zone 146 and housing 39, the downwardly converging sheets of air contact the meltblown filaments imparting drag forces to further drawdown the fibers. The additional drawdown by the use of the filament drawing device produces microsized fibers in the range of 0.5 to 5 microns, preferably 1 to 2 microns.

Note that in this alternative mode of meltblowing operation, the DCD (die to collector distance) is much larger than the DCD for conventional meltblowing as is apparent by comparing station 10B with FIG. 12. With the drawing device 27, the DCD ranges from 3 to 8 feet, preferably from 3 to 7 feet, most preferably 4 to 6 feet.

Operation

Operating Parameters for the Spunbond Station(s)

The resin used in the spunbond die(s) can be any of the commercially available spunbond grades, including a wide range of thermoplastics such as polyolefins, polyamides, polyesters, PVA, PVC, polyvinyl alcohol, cellulose acetate and the like. Polypropylene, because of its availability, is the preferred thermoplastic. The operation parameters of the spunbond stations using polypropylene (MFR 10 to 400) may be as follows:

|  | Broad Range | Preferred Range |
|---|---|---|
| Spinning Plate | | |
| length (m) | 0.5 to 6 | 0.5 to 4.5 |
| width (in) | 2 to 12 | 3 to 6 |
| Orifices | | |
| spacing (in) | 0.05 to 0.250 | 0.1 to 0.125 |
| diameter (in) | 0.001 to 0.040 | 0.016 to 0.020 |
| Quench Ducts | | |
| size height (m) | 0.5 to 2 | 0.8 to 1.2 |
| width (m) | 0.5 to 6 | 0.5 to 4.5 |
| Die to Collector (m) | 0.1 to 5 | 0.1 to 2 |
| Distance (DCD) | | |
| Polymer Melt | | |
| Temp. (° F.) | 325 to 750 | 375 to 550 |
| Rate (Gr./hole/min) | 0.05 to 5 | 0.3 to 1.2 |
| Quench Air | | |
| Temp. (° C.) | 2 to 20 | 5 to 15 |
| Rate (SCFM/in) | 1,000 to 20,000 | 5,000 to 15,000 |
| Drawing Device | | |
| Temp. | Ambient | |
| Rate (SCFM/in) | 1 to 100 | 5 to 20 |

The specification and operating parameters listed above are for purposes of illustration. The spinning plate and chamber, as well as the quenching ducts may be conventional. Reference is made to U.S. Pat. Nos. 3,692,618, 4,041,203 and 4,340,563, the disclosure of which are incorporated herein.

Operating Parameters for the Meltblowing Station

The meltblowing die (e.g. orifices, size and spacing) may be constructed in accordance with a variety of designs including those disclosed in U.S. Pat. Nos. 3,92,759, 4,818, 463, the disclosure of which are incorporated herein by reference.

The specification and operating parameters listed above are for purposes of illustration. The spinning plate and chamber, as well as the quenching ducts, may be conventional. Reference is made to U.S. Pat. No. 3,692,618, 4,041,203 and 4,340,563, the disclosure of which are incorporated herein.

Operating Parameters for the Meltblowing Station(s)

The meltblowing die (e.g. orifices size and spacing) may be constructed in accordance with a variety of designs including those disclosed in U.S. Pat. Nos. 3,972,759 and 4,818,463, the disclosure of which are incorporated herein by reference.

The meltblowing die may process any of the commercially available meltblowing grade thermoplastic resins. These include a wide range of polyolefins such as propylene and ethylene homopolymers and copolymers. Specific thermoplastics includes ethylene acrylic copolymers, nylon, polyamides, polyesters, polystyrene, poly(methyl methacrylate), polytrifluoro-chloroethylene, polyurethanes, polycarbonates, silicone sulfide, and poly(ethylene terephthalate), pitch, and blends of the above. The preferred resin is polypropylene. The above list is not intended to be limiting, as new and improved meltblowing thermoplastic resins continue to be developed.

The preferred resin is a meltblowing grade of polypropylene. The following is an illustrative example of a meltblowing station:

|  | Broad Range | Preferred Range |
|---|---|---|
| Orifice Row (length) | 0.5 to 6 meters | 0.5 to 4.6 meters |
| Orifice | | |
| Diameter (inches) | 0.010 to 0.050 | 0.01 to 0.2 (Typically 0.015) |
| Spacing (orifices/in) | 10 to 40 | 20 to 35 |
| Polymer | | |
| Temp (° C.) | 175 to 300 | 200 to 270 |
| Rate (Ger/hole/min) | 2 to 5 | 0.3 to 1.2 |
| Primary Air | | |
| Temp (° C.) | 175 to 300 | 200 to 275 |
| Rate (SCFM/in) | 2 to 100 | 5 to 30 |
| Quench Air (if used) | | |
| Temp (° C.) | 2 to 20 | 5 to 15 |
| Rate (SCFM/in) | 1,000 to 20,000 | 5,000 to 15,000 |
| Drawing Air | | |
| Temp | Ambient | |
| Rate (SCFM/in) | 1 to 100 | 5 to 20 |
| DCD Distance to Collector (inches) | 3 to 24 | 5 to 20 |
| DCD Distance to Collector (feet) (Intermediate setting) | 2 to 6 | 3 to 5 |

Operating Procedure

The multi-station line shown in FIG. 1 illustrates the mode for manufacturing a spunbond-meltblown-spunbond (S-M-S) laminate. In station 10A, the spinning assembly 16 is provided with a spunbond die insert 97 and the moveable support structure 15 is adjusted to the upper position to provide the desired DCD. The quench ducts 26 and filament stretching device 27 are moved into place. In station 10B, the carriage 33 with the equipment mounted thereon has been removed and the melt spinning assembly 16 is provided with a meltblowing die insert 96. The moveable support structure 15 is positioned at its lower position placing the spinning assembly 16 at its proper meltblowing DCD. Station 10C is identical to station 10A.

The operations are commenced by spinning continuous filaments from the spunbond die 97 of station 10A. The filaments pass through the quenching zone 45 which not only cools the filaments but maintains them apart to prevent the filament from sticking together. The quenched filaments pass through the stretching zone 46 of device 27 where air discharging therefrom further drawsdown and attenuates the filaments. The filaments are deposited on the conveyor 36 in a random fashion. The spunbond filaments have an average diameter of 12 to 50 microns, preferably 15 to 40 microns. Air passes through the conveyor 36 and is withdrawn by the vacuum system 25.

Layer 42 is conveyed under the spinning assembly of station 10B wherein a microsized fibers having an average fiber diameter of 0.5 to 15 microns, preferably 1 to 10 microns, most preferably 2 to 6 microns, is blown onto layer 42 forming meltblown layer 43 on spunbond layer 42.

The two layer laminate is then conveyed under Station 10C wherein another layer 44 of spunbond filaments are deposited on top of the meltblown layer 43, completing the S-M-S structure. The three layer structure may then be passed through a calendering or other device to bond the layers together in the conventional manner.

Based on the description contained herein, it will be readily apparent to those skilled in the art that the apparatus of the present invention offers flexibility not attainable with prior art devices. By selectively modifying the stations, the line can produce, in addition to S-M-S structure, the following laminates:

S-S, M-M, S-M, M-S using only two of the stations.

S-S-S, M-M-M wherein each layer may have different properties, or additives, or colors.

S-S-M, M-S-M, M-M-S, S-M-M, M-S-S lamination using all three stations.

The following summarizes the more important features of the present invention:

(a) a moveable support structure for meltblowing or spunbond.

(b) a melt spinning assembly adapted to receive either meltblowing or spunbond die inserts.

(c) a meltblowing die having an auxiliary or supplementary filament stretching device.

(d) a novel filament stretching device that can be used with spunbond or meltblowing dies.

What is claimed is:

1. An in-line method of manufacturing thermoplastic nonwoven components comprising:

(a) mounting a spunbond spinning assembly on a first vertically moveable support structure having an upper position and a lower position;

(b) positioning the first vertically movable support structure to an upper position wherein the spunbond spinning assembly is positioned above the lower position;

(c) positioning a quenching device and filament drawing device under the spunbond spinning assembly in vertical alignment therewith;

(d) extruding filaments from the spunbond spinning assembly;

(e) passing the filaments through the quenching device and the filament drawing device;

(f) depositing the filaments onto a conveyor to form a first layer;

(g) mounting a meitblowing spinning assembly on a second vertically moveable support structure;

(h) positioning the second vertically movable support structure in a lower position;

(i) passing the conveyor with the first layer under the meltblowing spinning assembly;

(j) meitblowing filaments from the meltblowing spinning assembly; and (k) depositing the meltblown filaments on top of the first layer.

2. The method of claim 1 wherein the filaments in step (d) are polyolefins selected from homopolymers and copolymers of ethylene and propylene and the filaments have an average filament diameter of in excess of 12 microns.

3. The method of claim 2 wherein the meltblown filaments are polyolefins selected from homopolymers and copolymers of ethylene and propylene and have an average diameter of 1 to 10 microns.

4. The method of claim 3 wherein the filaments are polypropylene.

5. The method of claim 1 further comprising the step of bonding the two layers together.

* * * * *